UNITED STATES PATENT OFFICE.

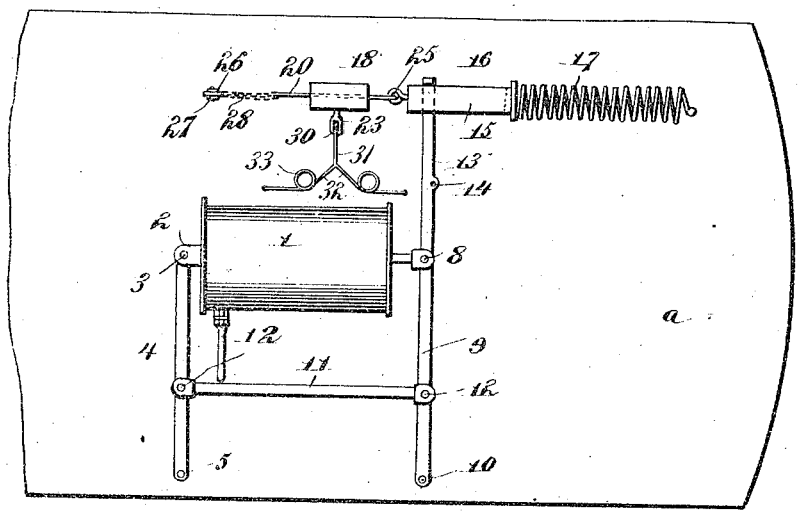

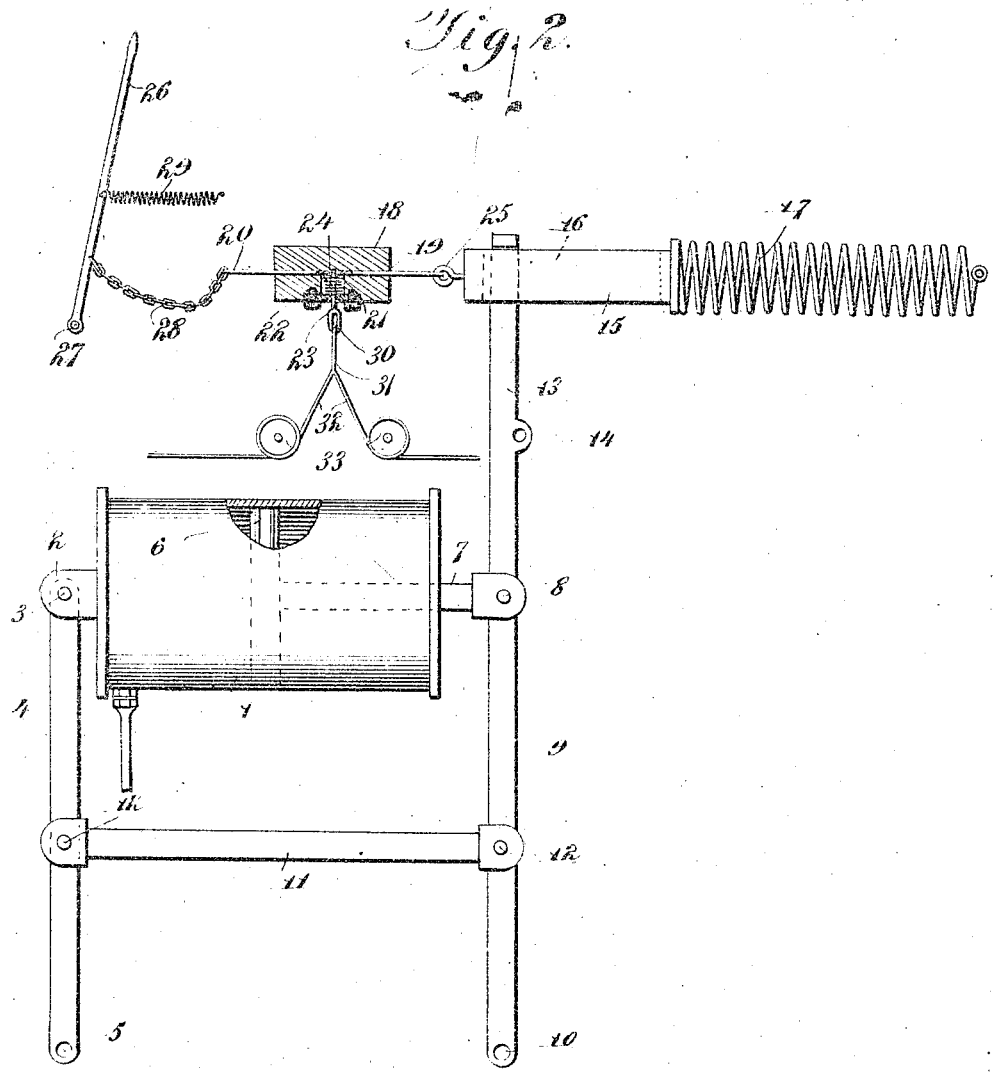

ALBERT W. BUELL, OF ST. PAUL, MINNESOTA, ASSIGNOR TO MELVILLE H. O. FISHER, OF ST. PAUL, MINNESOTA.

BRAKE-SETTING MECHANISM.

1,063,327.          Specification of Letters Patent.      Patented June 3, 1913.

Application filed May 3, 1912. Serial No. 694,819.

*To all whom it may concern:*

Be it known that I, ALBERT W. BUELL, a citizen of the United States of America, residing at St. Paul, in the county of Ramsey and State of Minnesota, have invented new and useful Improvements in Brake-Setting Mechanisms, of which the following is a specification.

This invention relates to improvements in brakes and has particular application to an emergency brake setting mechanism for use in conjunction with air brake systems.

In carrying out the present invention, it is my purpose to provide an emergency brake setting mechanism by means of which the brake shoes may be instantaneously applied to the wheels independently of the air pressure and the usual hand operating appliances.

Furthermore, I aim to provide an emergency brake setting mechanism which may be connected up with the cylinder levers of the brake cylinder of an air brake system and whereby the brake shoes may be applied to the wheels independently of the air pressure and against the action of the restoring devices and atmospheric pressure on the inactive side of the piston within the respective brake cylinder, that is, the side of the piston opposite from that acted upon by the air pressure of the system.

It is also my purpose to provide a mechanism of this class which may be applied to any wheeled vehicle and connected up to the air brake system thereof without materially changing the parts and which will be simple in construction, effective in operation, and cheap to install and maintain.

With the above and other objects in view, the invention consists in the construction, combination and arrangement of parts hereinafter set forth in and falling within the scope of the claims.

In the accompanying drawings; Figure 1 is a bottom plan view of a wheeled vehicle equipped with the present invention. Fig. 2 is a diagrammatic view of the same, and Fig. 3 is a fragmentary side elevation of a car showing a modified form of the invention.

In carrying my invention into practice, the emergency brake setting mechanism forming the subject matter of the present invention, is connected up to one of the cylinder levers of the air brake mechanism, such cylinder lever being relatively long for this purpose and capable of operating under the action of the air pressure and the usual hand operating appliances, independently of the emergency brake setting mechanism and without affecting such mechanism.

Referring now to the accompanying drawings in detail, the bottom of a car or other rolling stock is indicated at *a* and to such bottom is fastened in any suitable manner the usual brake cylinder 1 connected up in any suitable manner to the air pipes of any well known or selected form of air brake mechanism and equipped at one end with a pair of spaced parallel ears 2 between which is pivotally mounted as at 3 the usual cylinder lever 4 having its free end 5 connected to the brake beams of the particular trucks by means of the usual connecting rod or the like. Mounted for reciprocation within the cylinder 1 is a piston 6 equipped with a piston rod 7 extending beyond the end of the cylinder opposite from the ears 2 and pivotally connected as at 8 to the other cylinder lever 9 which latter has its free end 10 connected up to the particular brake beam of the trucks through the medium of any suitable connecting rod or the like, while interconnecting the levers 4 and 9 is the usual cylinder lever rod 11 having its extremities pivoted as at 12, 12 to the respective cylinder levers intermediate the lengths of such levers. The piston 6 may be moved toward the piston rod end of the cylinder to effect the application of the brakes by any suitable means, such, for instance, as by air pressure, and actuated inwardly of the cylinder and against the action of such pressure by a spring to maintain the brake shoes disengaged from the wheels. One of the cylinder levers, as the cylinder lever 9, is extended beyond its pivotal connection with the piston rod 7 to form a lever 13 provided at an appropriate point with an eye 14 adapted for connection with the hand operating appliances of the brake mechanism so that the brakes may be applied by hand independently of the air pressure.

The emergency brake setting mechanism, in the present instance, includes a link 15 mounted for sliding movement within suitable guides on the bottom of the vehicle and formed with an elongated slot 16 through which is passed the free extremity of the lever 13, the latter when inactive normally engaging one wall of the slot as shown in Fig. 2, and connected to one extremity of the link member 15 is a suitable tension device as a contractile spring 17, the opposite end of the latter being fixed to an appropriate part of the car or vehicle, such spring normally tending to slide the link 15 and throw the lever 13 to actuate the cylinder levers to effect the application of the brake to the car wheels. This spring is of sufficient power to overcome the action of the restoring device and atmospheric pressure on the inactive side of the piston within the brake cylinder so that when the spring is permitted to act the piston will be drawn toward one end of the brake cylinder and against the action of the restoring device therein to apply the brakes to the wheels independently of the air.

In order to hold the link 15 against the action of the tension means, I make use of a latch mechanism which in the present instance consists of a block 18 formed with a longitudinal slot 19 through which is passed a metallic strip 20, and provided with a bore 21 arranged at right angles to the slot 19 and housing a latching pin 22 equipped with a shank 23 passed through an aperture in the block contiguous the bore. This strip 20 is formed with an aperture designed to register with the bore 21 and adapted to receive the latching pin 22, and the latter is normally held within the aperture in the strip by means of a coiled expansion spring 24 encircling the shank 23 of the latching pin intermediate one wall of the bore and the adjacent surface of the pin, as clearly illustrated in Fig. 2. One extremity of the metallic strip 20 is connected to an eye 25 fastened to the link 15, while the opposite extremity of such latching strip has connection with a resetting device the latter being operable manually to restore the link 15 to an inactive position subsequent to the action of the spring 17. This resetting device, in the present embodiment of the invention embodies an operating lever 26 pivoted as at 27 to an appropriate part of the car, and connected by means of a chain 28 or other flexible element to the free extremity of the strip 20, a spring 29 being connected at one extremity to the operating lever and having its opposite extremity fixed to a suitable part of the vehicle body and serving to normally hold the operating lever in an inoperative position.

From the foregoing description taken in connection with the device shown in Figs. 1 and 2, the construction and mode of operation will be readily apparent. Assuming the parts to be in the position shown in Fig. 2, and it is desired to apply the brakes independently of the air, the latching pin 22 is withdrawn from engagement with the opening in the strip 20 whereby the spring 17 will act upon the link 15 to slide the latter within its guides and consequently draw the lever 13 and the piston in the brake cylinder against the restoring device, thereby applying the brakes to the wheels and bringing the vehicle to a stop. To reset the emergency brake setting mechanism, the operating lever 26 is moved about its pivot 27 and against the action of the spring 29 with the effect to pull the chain 28 and draw the strip 20 through the block 18 and against the action of the spring 17, the latching pin 22 reëntering the opening in the strip 20 when such opening registers with the bore in the block. The release of the pin 22 is preferably brought about from a part of the vehicle convenient to the motorman or operator, and for this purpose the shank 23 of such pin is formed with an eye 30 to which is connected one extremity of a cord, cable or the like 31 terminating in branch cables 32, 32 each trained over a guide sheave 33 journaled to a suitable part of the car body, the free extremities of the cables 32, 32 terminating at the platforms from which the motorman has control of the car or vehicle and having such extremities connected to suitable operating levers or rods so that when a pull is exerted upon the chains, the latching pin will be withdrawn, as previously described.

Referring now to the modified form of the invention shown in Fig. 3, the emergency brake setting mechanism is connected up to the fender of the car and capable of actuation therefrom so that when such fender meets an obstruction, the brakes will be instantaneously applied. As the fender at each end of the car is connected to the emergency brake setting mechanism in a manner identical to that of the other fender, it is thought that a description and showing of one will suffice for both. The fender is indicated at 34 and is swiveled or otherwise secured to the car body and held in an elevated position by means of a contractile spring 35, and rigidly connected to the end of each fender immediately below the bottom of the car, is an arm 36 connected as at 37 to the respective chain 32. Thus, when the fender contacts with an object such fender will be depressed with the effect that the cord or cable 32 is actuated to withdraw the latching pin from engagement with the strip 20 whereby the emergency brake setting mechanism will actuate as previously described.

While I have herein shown and described certain particular embodiments of my invention by way of illustration, it is to be understood that I do not limit or confine myself to the exact details of construction herein described and delineated, as modification and variation may be made within the scope of the claims and without departing from the spirit of the invention.

I claim:

1. The combination with a brake cylinder, cylinder levers and cylinder lever rods, an emergency brake setting mechanism, a connection between said mechanism and one of the cylinder levers, latching means normally holding said mechanism inoperative and adapted to render the same operative, and means associated with said latching means and operable to relieve the brake setting mechanism of the influence of the latching means.

2. The combination with a brake cylinder, cylinder levers and cylinder lever rods, of an emergency brake setting mechanism, a connection between said mechanism and one of the cylinder levers, and latching means normally holding said mechanism inactive and adapted to render the same operative, said latching means comprising a block, a strip slidably disposed within the block and connected to the brake setting mechanism, a latching pin within the block and adapted to engage the strip, and means for disengaging the latching pin from the strip.

3. The combination with a brake cylinder, cylinder levers and cylinder lever rods, of an emergency brake setting mechanism, a connection between said mechanism and one of the cylinder levers, latching means normally holding said mechanism inactive and adapted to render the same operative, and a resetting device for said mechanism, said resetting device including a lever manually operable to restore the brake setting mechanism subsequent to the release of the latching means, and a connection between said lever and latching means.

4. The combination with a brake cylinder, cylinder levers and cylinder lever rods, of an emergency brake setting mechanism, a connection between said mechanism and one of the cylinder levers, latching means normally holding said mechanism inoperative, and adapted to render the same operative, and means associated with the latching means and operable manually and automatically to relieve the emergency brake setting mechanism of the influence of the latching means.

In testimony whereof I affix my signature in presence of two witnesses.

ALBERT W. BUELL.

Witnesses:
FRANK FORD,
MARIE JARSHISHEK.